(12) United States Patent
Rodriguez

(10) Patent No.: US 7,240,444 B1
(45) Date of Patent: Jul. 10, 2007

(54) COMPUTER TYPING AID

(76) Inventor: Jose R. Rodriguez, 442 E. Indian Rock Rd., Vista, CA (US) 92084

( * ) Notice: Subject to any disclaimer, the term of this patent is extended or adjusted under 35 U.S.C. 154(b) by 295 days.

(21) Appl. No.: 10/888,848

(22) Filed: Jul. 12, 2004

(51) Int. Cl.
*B41J 11/36* (2006.01)
*B41J 13/00* (2006.01)

(52) U.S. Cl. .......................................................... 40/343

(58) Field of Classification Search ................. 40/341, 40/342, 343; 248/442.2, 452; 211/1.57, 211/46; 400/718
See application file for complete search history.

(56) References Cited

U.S. PATENT DOCUMENTS

| | | | |
|---|---|---|---|
| 390,800 A * | 10/1888 | Palmer | 248/442.2 |
| 4,775,039 A * | 10/1988 | Sunakawa | 477/11 |
| 4,936,034 A | 6/1990 | Chen et al. | |
| 5,027,958 A * | 7/1991 | Agardi | 211/119.1 |
| 5,067,681 A | 11/1991 | Huang et al. | |
| 5,301,915 A * | 4/1994 | Bahniuk et al. | 248/452 |
| 5,371,447 A * | 12/1994 | Boss | 318/265 |
| 5,383,642 A * | 1/1995 | Strassberg | 248/442.2 |
| 5,493,943 A | 2/1996 | Horikawa | |
| 5,549,268 A | 8/1996 | Hopwood | |
| 5,620,162 A | 4/1997 | Beckwith et al. | |
| D396,248 S | 7/1998 | Nemeth | |
| 5,956,158 A * | 9/1999 | Pinzarrone et al. | 358/474 |
| 6,003,138 A * | 12/1999 | Chung | 713/300 |
| 6,239,841 B1* | 5/2001 | Verstockt et al. | 348/373 |
| 6,290,200 B1 | 9/2001 | Ko | |
| 6,412,744 B1* | 7/2002 | Wollam et al. | 248/442.2 |
| 2003/0111581 A1* | 6/2003 | Drewery et al. | 248/447.1 |

OTHER PUBLICATIONS

American Heritage Dictionary of the English Language, Fourth edition, 2000, Houghton Mifflin Company.*

* cited by examiner

*Primary Examiner*—Lesley D. Morris
*Assistant Examiner*—Christopher Veraa

(57) ABSTRACT

A computer device for assisting a user to type from printed matter, which includes a crossbar provided with mounting posts that allow it to be positioned on a laptop screen. The present invention further includes a document grasping mechanism with clips secured to the crossbar. The power mechanism for automatically repositioning the printed matter along the width of the laptop screen includes an electric motor, an output shaft, and pulleys. A belt is caused to move in a direction corresponding to the shaft rotation and is powered by the motor. The power mechanism also includes a USB cable connected to the electric motor and a laptop USB port respectively. When a user types, the laptop communicates with the electric motor via the USB cable for causing the motor to rotate selectively position the document along the laptop screen so that a user can maintain a line of sight with the screen during operating conditions.

17 Claims, 4 Drawing Sheets

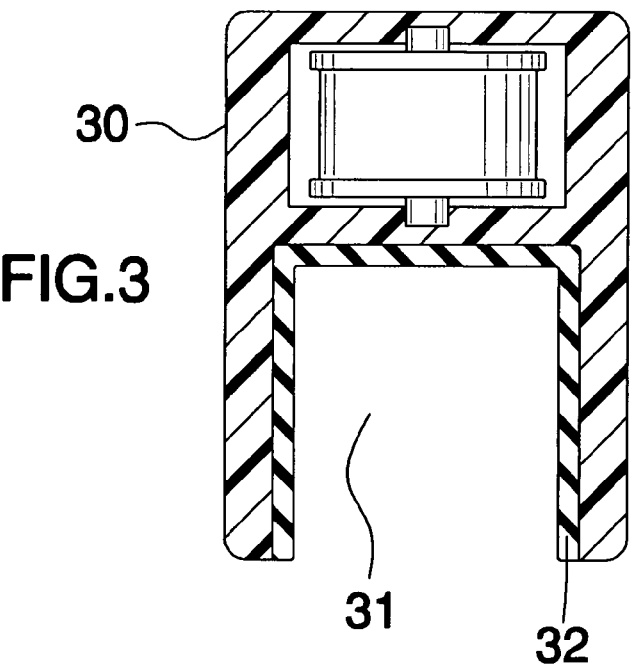
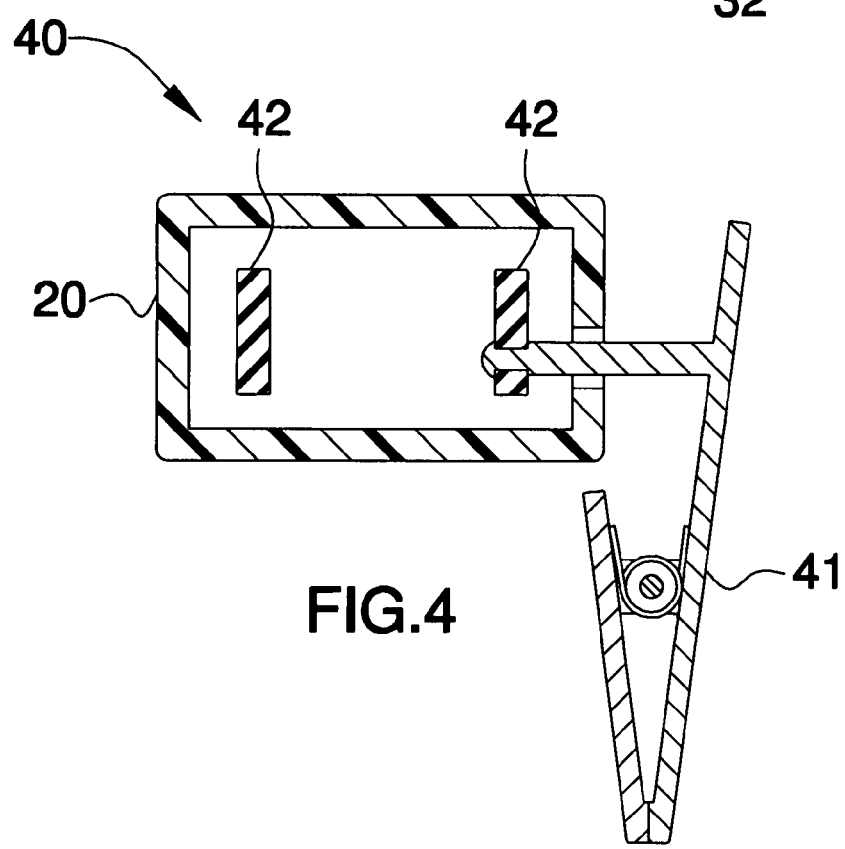

COMPUTER TYPING AID

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a typing aid and, more particularly, to a computer typing aid that cooperates with a PC during operating conditions so that a user can simultaneously view selected portions of the display screen and a printed document.

2. Prior Art

Many paper, book holders have been disclosed. Such desk-top holders are usually mounted on a table, particularly when a personal computer with its peripherals such as keyboard, printer, monitor, mouse pad, scanner etc., are occupying much of the table space. This is very inconvenient for the user during the operation of a P.C. when a mis-touch of the keyboard may cause serious errors or unexpected trouble.

Conventional reading stands are of the type having an inclined back member to support a book or other reading material. Such reading stands, of course, are convenient for those using typewriters, computers and musical instruments. Many of the devices for reading the content of each page of a book by scanning, such as CCD (Charge Coupled Device) are provided with a page turner. Such a page turner is provided with a book holder for placing thereon a book to be held open and a suction nozzle is provided so as to be rotatable by a drive force transmitted from a gear. The top page of the book held open on the book holder is air-sucked by a suction nozzle. In this state, by rotating the suction nozzle, the pages of the book are successively turned one by one.

In addition, a groove provided at the center of the book holder accommodates the spine of the book in order to set the book on the book holder. However, in the arrangement of the above conventional page turner, since the book is placed directly on the book holder, as the pages of the book are turned, one side of the opened page gets lower, and the other side of the opened page—gets higher, and thus the position of the top page of the book held open changes.

Moreover, the book holder is a fixed-type, and the book is set on the book holder only by fitting the spine of the book into the groove formed in the book holder. The buckling of the page of book may occur depending on the quality of the paper used for the pages of book. Therefore, when scanning the book by the page turner provided in the CCD, the scanning position must be adjusted according to the height position of the top page of the book. Furthermore, in order to prevent the occurrence of the buckling of the page, a complex device or mechanism structure is required.

The sliding-type of page turner is available as well. The sliding-type page turner is arranged as follows: The side of the page is buckled up, for example, by sliding a roller, and a pin is inserted into the buckled portion. Then, the book holder is moved, thereby turning the page. However, the sliding-type page turner also presents the following problem: The pages of the book are turned by moving the book holder only in one direction.

Therefore, when turning a plurality of pages in one direction, every time a page is turned, the book holder must be moved back to the original position, thereby presenting the problem of low operating speed. Moreover, page turning means are required separately for turning the pages on the left hand side of the book, and for turning the pages on the right hand side of the book. Because this makes the control system complicated, the compact-size page turner cannot be achieved.

While many of these paper holders can hold such papers in a position where they are readily visible by the operator of the computer, known paper holders of this type lack the degree of adjustability that may be desired particularly when the operator is reading from paper of different sizes.

Additionally, for those with physical defects, such reading stands and page turners are inconvenient to use. This is because a disabled person frequently cannot turn the pages of a book or some reading material themselves and must rely on the aid of another person.

Accordingly, a need remains for a computer typing aid electrically coupled to a PC and attached to a computer screen for allows a user to simultaneously read and type from a printed document. The present invention fulfills such a need by providing a servomotor that holds and automatically moves a piece of paper as needed by the typist while attached to a monitor or laptop screen. This eliminates the need to sit in an uncomfortable position to read a document that is lying on a desk or use an additional supporting apparatus to read a document.

BRIEF SUMMARY OF THE INVENTION

In view of the foregoing background, it is therefore an object of the present invention to provide a computer typing aid. These and other objects, features, and advantages of the invention are provided by a computer typing device for assisting a user to type from printed matter. Such a device includes a crossbar that has a horizontally disposed longitudinal axis and opposed end portions defining a cavity therebetween. Such a crossbar further has a slot extending between the end portions thereof.

The present invention further includes a plurality of mounting posts oppositely spaced and secured to the end portions respectively. Such posts have a lower portion forming a channel respectively. Such channels are removably positionable along an upper portion of a laptop screen so that the crossbar can become disposed along a substantially horizontal plane within a width of the laptop screen. Furthermore, the channels are provided with an inner rubber layer for assisting to maintain the crossbar at a substantially stable position during operating conditions. The crossbar and the plurality of posts are preferably formed from corrosion-resistant material but may be formed from other suitable light-weight materials, well known in the industry.

The present invention further includes a mechanism for releasably grasping printed matter along the upper portion of the laptop screen. Such a grasping mechanism includes a plurality of clips secured to the crossbar and is slidably positionable between the end portions thereof. In particular, the plurality of clips are spaced along the belt.

Advantageously, the present invention further includes a power mechanism for automatically repositioning the printed matter along the width of the laptop screen so that a user can contemporaneously view selected text on the laptop screen while viewing the printed matter. Such a power mechanism includes an electric motor that has a vertically disposed output shaft extending outwardly and away therefrom. The power mechanism further includes a plurality of pulleys disposed adjacent the cross bar end portions and within the slot. One of the plurality of pulleys is operably connected to the output shaft and is caused to rotate in a selected direction when the output shaft rotates. A belt is disposed about the plurality of pulleys and is caused to move in a direction corresponding to the shaft rotation.

Such a power mechanism also includes a USB cable with opposed end portions connected to the electric motor and a laptop USB port respectively. The USB cable allows the laptop to communicate with the electric motor when a user types to thereby cause the motor to selectively rotate based upon user input detected by the laptop. Advantageously, the printed matter is repositioned along the width of the laptop screen so that a user can maintain a line of sight between the laptop screen and printed matter.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is an enlarged cross-sectional view of the cross-bar and pulley, taken along line 3—3;

FIG. 4 is an enlarged cross-sectional view of a clip attached to the belt, taken along line 4—4.

DETAILED DESCRIPTION OF THE INVENTION

Figure 1:
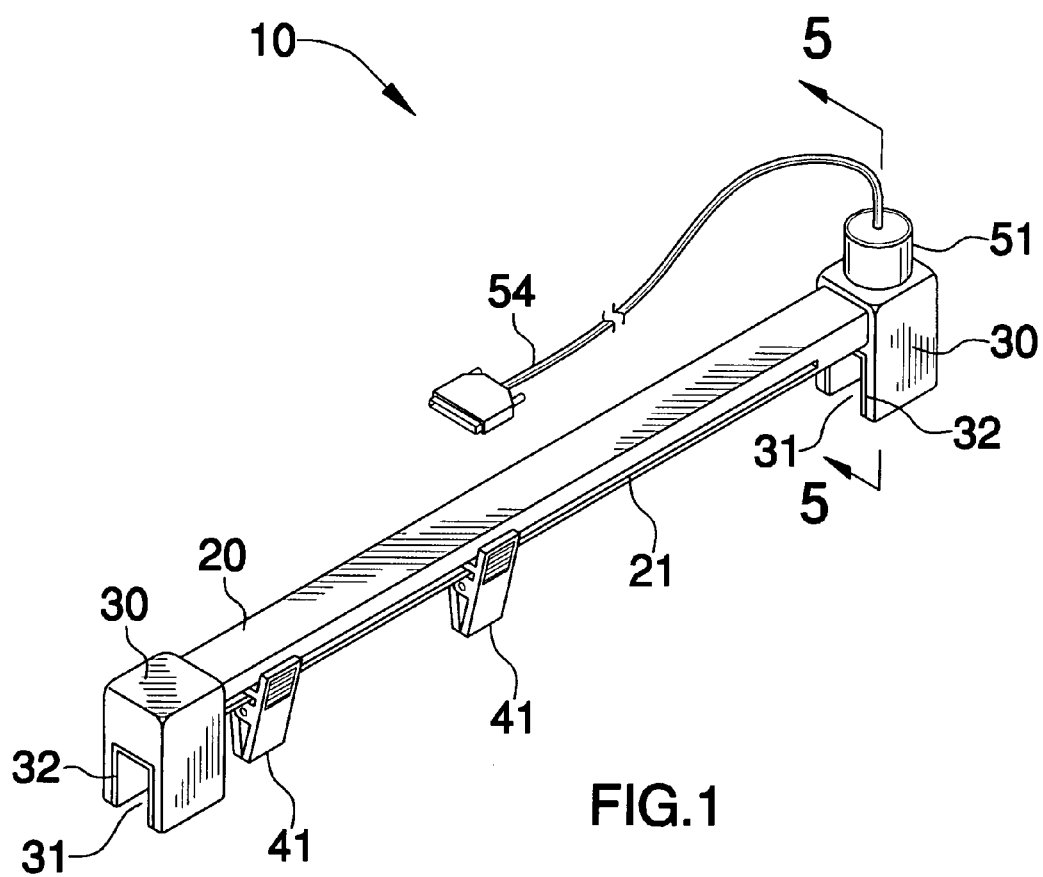
FIG. 1 is a perspective view showing a device that is attachable to a laptop screen for assisting a user while typing from a printed document, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–5 by the reference numeral 10 and is intended to allow a user to simultaneously read and type from a printed document. It should be understood that the device 10 may be used by anyone who uses a PC or laptop, including home users, business users, and students.

Figure 2:
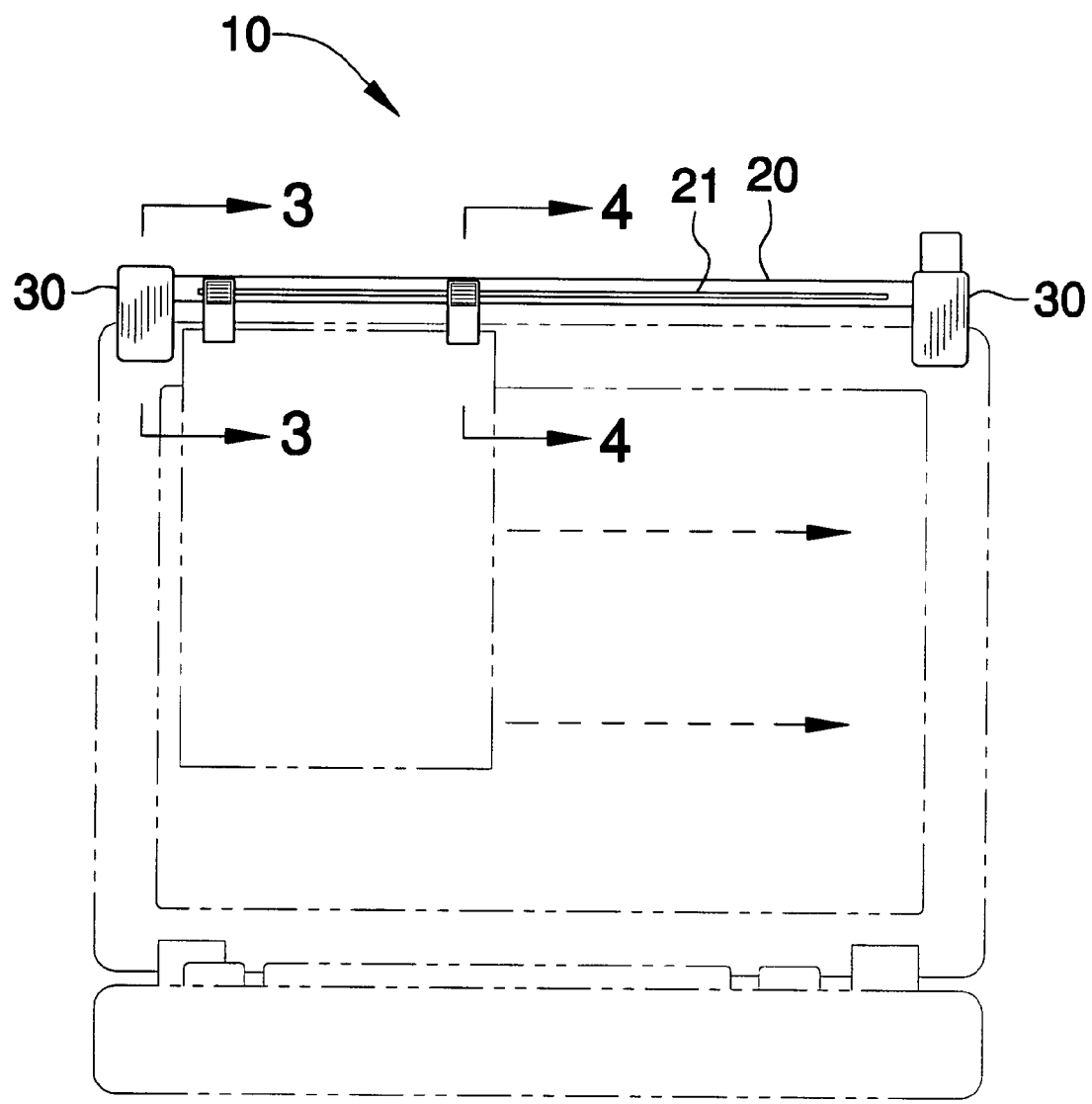
FIG. 2 is a front elevational view of the present invention shown in FIG. 1.

Referring initially to FIGS. 1 and 2, the device 10 includes a crossbar 20 that has a horizontally disposed longitudinal axis and opposed end portions defining a cavity therebetween. Such a crossbar 20 further has a slot 21 extending between the end portions thereof. The slot may be sized and shaped to accommodate a variety of documents having alternate dimensions.

The present invention further includes a plurality of mounting posts 30 oppositely spaced and secured to the end portions respectively. Such posts 30 have a lower portion for a channel 31 respectively. Such channels 31 are removably positionable along an upper portion of a laptop screen so that the crossbar 20 can become disposed along a substantially horizontal plane within a width of the laptop screen. Furthermore, the channels 31 are provided with an inner rubber layer 32 for assisting to maintain the crossbar 20 at a substantially stable position during operating conditions.

The crossbar 20 and the plurality of posts 30 are preferably formed from corrosion-resistant material but may be formed from other suitable light-weight materials, well known in the industry. Unlike the present invention, most conventional document holders are freestanding on the desktop and do not allow the user to adopt the correct posture when copy typing. Additionally, such holders can easily be tipped or moved from position. The crossbar 20 and associated mounting posts 30 allow the present invention to attach directly to a computer screen to prevent the above-noted difficulties.

Referring to FIG. 4, the present invention further includes a mechanism for releasably grasping printed matter along the upper portion of the laptop screen. Such a grasping mechanism 40 includes a plurality of clips 41 secured to the crossbar 20 and is slidably positionable between the end portions thereof. In particular, the plurality of clips 41 are spaced along the belt 42.

Figure 5:
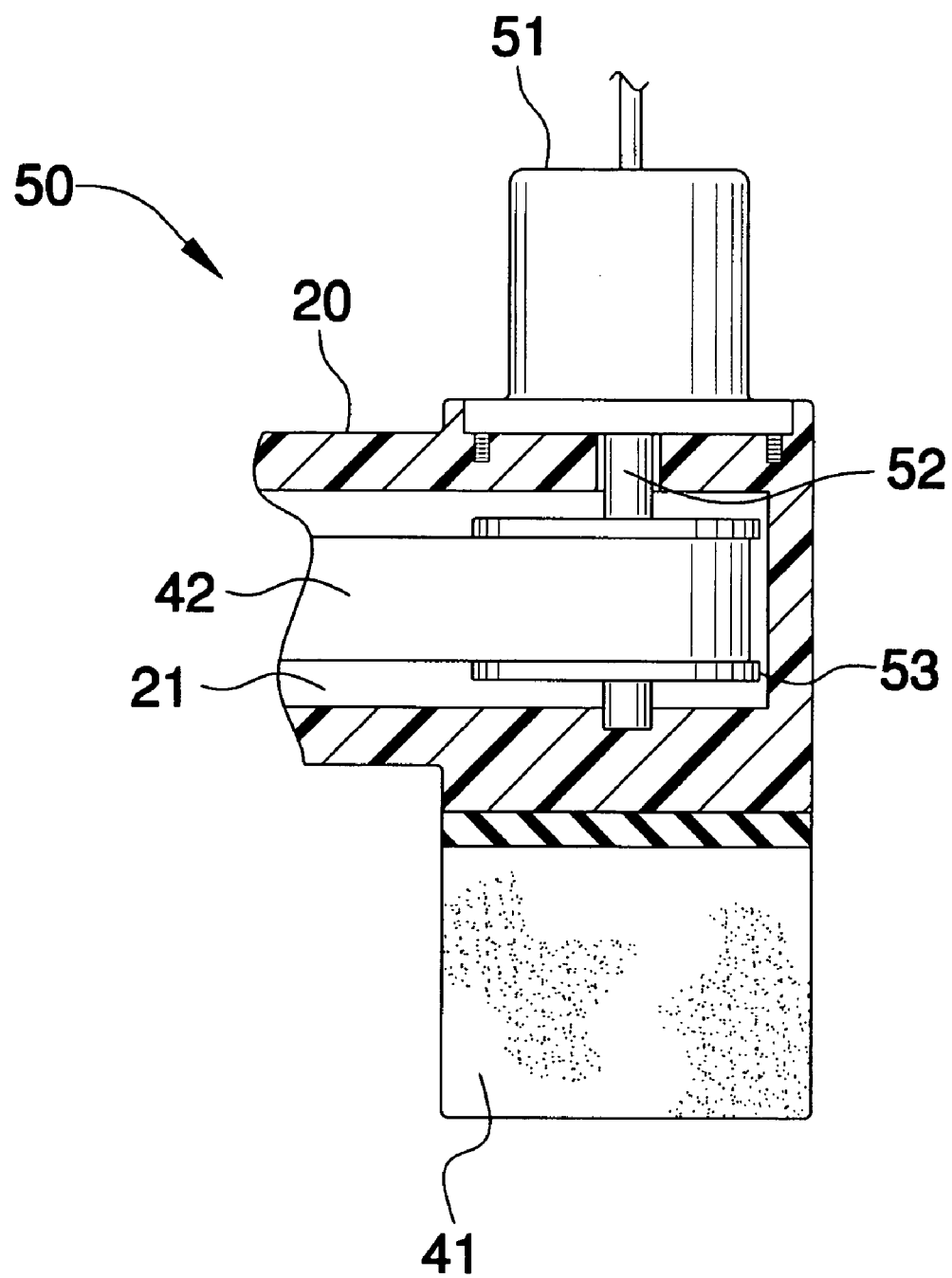
FIG. 5 is an enlarged cross-sectional view of the motor, taken along line 5—5.

Now referring to FIG. 5, the present invention advantageously includes a power mechanism 50 for automatically repositioning the printed matter along the width of the laptop screen so that a user can contemporaneously view selected text on the laptop screen while viewing the printed matter. Such a power mechanism 50 includes an electric motor 51 that has a vertically disposed output shaft 52 extending outwardly and away therefrom. The power mechanism 50 further includes a plurality of pulleys 53 disposed adjacent the cross bar end portions and within the slot 21. One of the plurality of pulleys 53 is operably connected to the output shaft 52 and is caused to rotate in a selected direction when the output shaft 52 rotates. A belt 42 is disposed about the plurality of pulleys 53 and is caused to move in a direction corresponding to the shaft 52 rotation.

Once again referring to FIG. 1, such a power mechanism 50 also includes a USB cable 54 with opposed end portions connected to the electric motor 51 and a laptop USB port respectively. The USB cable 54 allows the laptop to communicate with the electric motor 51 when a user types to thereby cause the motor 51 to selectively rotate based upon user input detected by the laptop. In other words, as words are typed, the PC takes note and issues a command to the motor 51 to rotate and move the belt 42 thereby moving the printed document. Advantageously, the printed matter is repositioned along the width of the laptop screen so that a user can maintain a line of sight between the laptop screen and printed matter. The movement of the paper is completely automatic; it requires no user intervention.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A computer typing device for assisting a user to type from printed matter, said device comprising:
    a crossbar having a horizontally disposed longitudinal axis and opposed end portions defining a cavity therebetween, said crossbar further having a slot extending between said end portions thereof;
    a plurality of mounting posts oppositely spaced and secured to said end portions respectively, said posts having a lower portion forming a channel respectively, the channels being removably positionable along an upper portion of a laptop screen so that said crossbar can become disposed along a substantially horizontal plane within a width of the laptop screen;
    means for releasably grasping printed matter; and
    power means for automatically repositioning the printed matter along the width of the laptop screen so that a user can contemporaneously view selected text on the laptop screen while viewing the printed matter.

2. The device of claim 1, wherein said grasping means comprises: a plurality of clips secured to said crossbar and being slidably positionable between said end portions thereof.

3. The device of claim 1, wherein said power moving means comprises:
    an electric motor having a vertically disposed output shaft extending outwardly and away therefrom;
    a plurality of pulleys disposed adjacent said cross bar end portions and within the cavity, one said plurality of pulleys being operably connected to said output shaft and being caused to rotate in a selected direction when said output shaft rotates;
    a belt being disposed about said plurality of pulleys and being caused to move in a direction corresponding to said shaft rotation; and
    a USB cable having opposed end portions connected to said electric motor and a laptop USB port respectively, said USB cable for communicating with said electric motor when a user types to thereby cause said motor to selectively rotate based upon user input detected by the laptop.

4. The device of claim 1, wherein said crossbar and said plurality of posts are formed from plastic material.

5. The device of claim 1, wherein the channels are provided with an inner rubber layer for assisting to maintain said crossbar at a substantially stable position during operating conditions.

6. The device of claim 3, wherein said plurality of clips are spaced along said belt.

7. A computer typing device for assisting a user to type from printed matter, said device comprising:
    a crossbar having a horizontally disposed longitudinal axis and opposed end portions defining a cavity therebetween, said crossbar further having a slot extending between said end portions thereof;
    a plurality of mounting posts oppositely spaced and secured to said end portions respectively, said posts having a lower portion forming a channel respectively, the channels being removably positionable along an upper portion of a laptop screen so that said crossbar can become disposed along a substantially horizontal plane within a width of the laptop screen, said crossbar and said plurality of posts being formed from corrosion-resistant material;
    means for releasably grasping printed matter; and
    power means for automatically repositioning the printed matter along the width of the laptop screen so that a user can contemporaneously view selected text on the laptop screen while viewing the printed matter.

8. The device of claim 7, wherein said grasping means comprises: a plurality of clips secured to said crossbar and being slidably positionable between said end portions thereof.

9. The device of claim 7, wherein said power means comprises:
    an electric motor having a vertically disposed output shaft extending outwardly and away therefrom;
    a plurality of pulleys disposed adjacent said cross bar end portions and within the cavity, one said plurality of pulleys being operably connected to said output shaft and being caused to rotate in a selected direction when said output shaft rotates;
    a belt being disposed about said plurality of pulleys and being caused to move in a direction corresponding to said shaft rotation; and
    a USB cable having opposed end portions connected to said electric motor and a laptop USB port respectively, said USB cable for communicating with said electric motor when a user types to thereby cause said motor to selectively rotate based upon user input detected by the laptop.

10. The device of claim 7, wherein the channels are provided with an inner rubber layer for assisting to maintain said crossbar at a substantially stable position during operating conditions.

11. The device of claim 9, wherein said plurality of clips are spaced along said belt.

12. The device of claim 7, wherein said corrosion-resistant material includes plastic.

13. A computer typing device for assisting a user to type from printed matter, said device comprising:
    a crossbar having a unitary and single body horizontally disposed longitudinal axis and opposed end portions defining a cavity therebetween, said crossbar being spaced above a display screen, said crossbar further having a slot extending between said end portions thereof and formed along a front planar face of said crossbar such that said slot is disposed along a plane above a top-most edge of the display screen;
    a plurality of mounting posts oppositely spaced and secured to said end portions respectively, said posts extending downwardly from said crossbar and remaining statically affixed thereto, said posts having a lower portion forming a channel respectively, said channels being removably positionable along an upper-most top edge of a laptop screen so that said crossbar can become disposed along a substantially horizontal plane within a width of the laptop screen, the channels being provided with an inner rubber layer for assisting to maintain said crossbar at a substantially stable position during operating conditions, said rubber layers being sized and positioned for engaging an upper portion of the laptop display screen, said crossbar and said plurality of posts being formed from corrosion-resistant material;

means for releasably grasping printed matter along the upper portion of the laptop screen; and power means for automatically repositioning the printed matter along the width of the laptop screen so that a user can contemporaneously view selected text on the laptop screen while viewing the printed matter.

14. The device of claim 13, wherein said grasping means comprises: a plurality of clips secured to said crossbar and being slidably positionable between said end portions thereof by linearly displacing along said slot.

15. The device of claim 13, wherein said power means comprises:

an electric motor having a vertically disposed output shaft extending outwardly and away therefrom;

a plurality of pulleys disposed adjacent said cross bar end portions and within the cavity, one said plurality of pulleys being operably connected to said output shaft and being caused to rotate in a selected direction when said output shaft rotates, a belt being disposed about said plurality of pulleys and being caused to move in a direction corresponding to said shaft rotation; and a USB cable having opposed end portions connected to said electric motor and a laptop USB port respectively, said USB cable for communicating with said electric motor when a user types to thereby cause said motor to selectively rotate based upon user input detected by the laptop.

16. The device of claim 15, wherein said plurality of clips are spaced along said belt and are partially housed within said cavity, said clips passing through said slot and terminating anterior of said front face of said crossbar.

17. The device of claim 13, wherein said corrosion-resistant material includes plastic.

* * * * *